March 1, 1966  W. H. HILL  3,238,351
ELECTRODE ASSEMBLY HAVING CANTILEVER SUSPENDED ELECTRODES
Filed Dec. 4, 1964  2 Sheets-Sheet 1

INVENTOR.
WILLIAM H. HILL,
By Walter R. Thiel
ATTORNEY.

March 1, 1966 W. H. HILL 3,238,351
ELECTRODE ASSEMBLY HAVING CANTILEVER SUSPENDED ELECTRODES
Filed Dec. 4, 1964 2 Sheets-Sheet 2
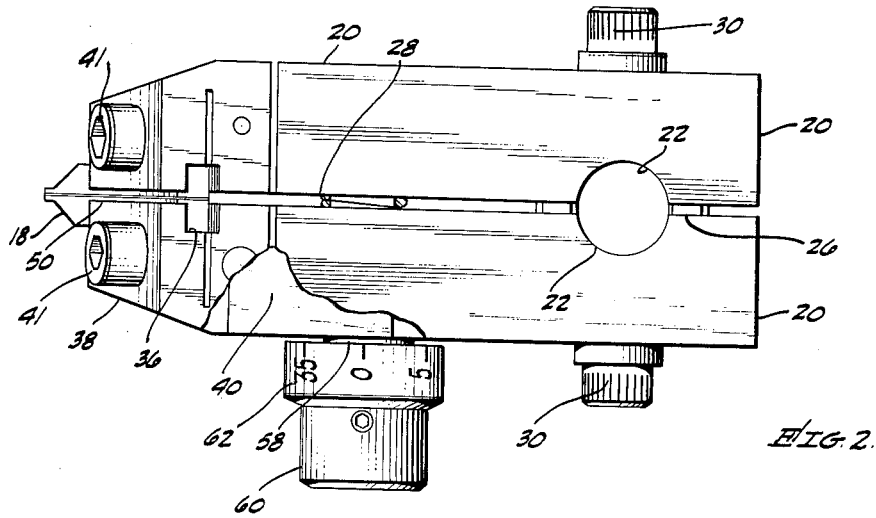
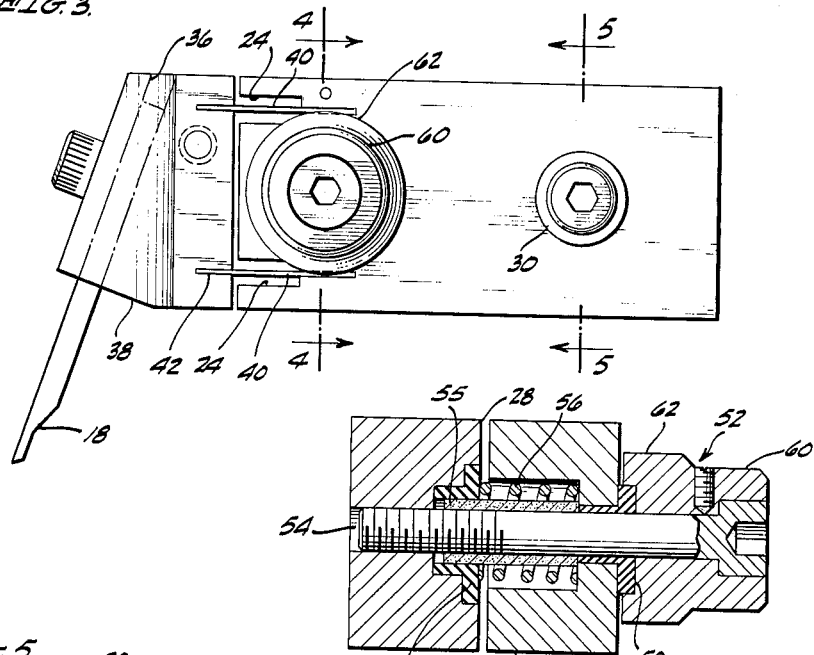
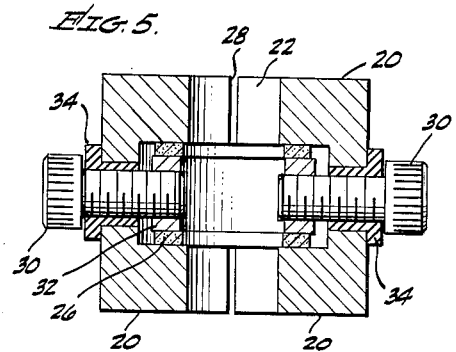
INVENTOR.
WILLIAM H. HILL,
By Walter R. Thiel
ATTORNEY.

United States Patent Office 3,238,351
Patented Mar. 1, 1966

3,238,351
ELECTRODE ASSEMBLY HAVING CANTILEVER SUSPENDED ELECTRODES
William H. Hill, Carlsbad, Calif., assignor to Hughes Aircraft Company, Culver City, Calif., a corporation of Delaware
Filed Dec. 4, 1964, Ser. No. 416,024
7 Claims. (Cl. 219—86)

This application relates to an electrode assembly for a resistance welding head and more particularly to an assembly for split-electrode series welding and parallel gap welding having independently suspended cantilevered electrodes and providing substantially equal loading on uneven surfaces and high rigidity to lateral displacement.

Prior art devices of this type have generally been of two configurations, dual weld heads mounted on a common base plate and dual operating rams arranged in a common head enclosure. While both of these devices have performed satisfactorily in certain welding operations their use has not been widespread because of their relative high cost and complexity.

Therefore, it is the object of the present invention to provide an improved electrode assembly for split-electrode series welding and parallel gap welding.

It is a further object of the present invention to provide an improved electrode assembly having independently suspended cantilevered electrodes.

It is a still further object of the present invention to provide an improved electrode assembly which is precisely adjustable to accurately maintain the gap between the electrodes.

Briefly the improved electrode assembly of the present invention comprises a clamp assembly having two clamping members for affixing the electrode assembly to the operating ram of a weld head and a pair of electrode holders each containing a welding electrode and separated by a variable air gap. The clamping members also are separated by an air gap and each includes means to electrically connect it to the weld head. The electrode holders are coupled to clamping members by pairs of wide flat cantilever springs and each pair of springs has one end affixed to one electrode holder and the other end affixed to one of the clamping members. The pair of springs operate in tandem to permit the electrode holder to deflect vertically while being held substantially rigid against horizontal deflection. A spring loaded shaft cooperates with both clamping members to accurately control the width of the air gap between the electrodes, and a calibrated knob is affixed to the exposed end of the shaft to register the width of this gap.

Other advantages of the invention will hereinafter become more fully apparent from the following description of the drawings which illustrates a preferred embodiment thereof and in which:

FIG. 2 is a top view of the improved electrode assembly of the present invention having a portion cut away to show a part of one of the flat cantilever springs;

FIG. 3 is a side elevational view of the improved assembly of the present invention showing more clearly the support of one electrode holder by the pair of flat springs and the slot for controlling the vertical deflection of the holder;

FIG. 4 is a sectional view taken at 4—4 in FIG. 3 showing the spring loaded air gap adjustment shaft and indicator knob; and FIG. 5 is a sectional view taken at 5—5 in FIG. 3 showing the clamp arrangement for affixing the clamp assembly to the insulated surface of the operating ram of a welding head.

Figure 1:
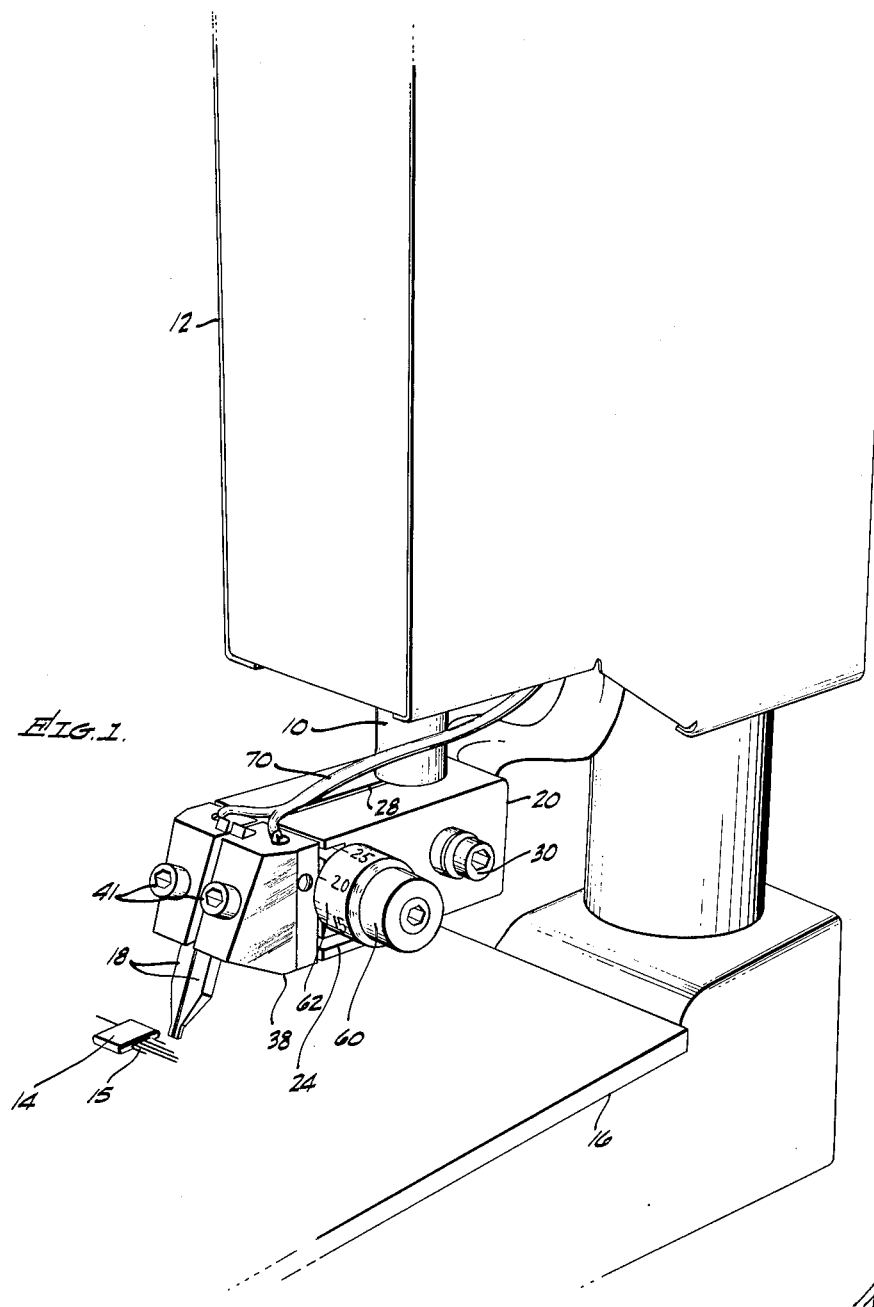
FIG. 1 is a perspective view of the improved electrode assembly of the present invention and a portion of a resistance welding head illustrating the cooperation between the two structures.

Referring now to FIG. 1, the improved electrode assembly of the present invention is shown attached to a movable or operating ram 10 of a resistance welding head 12 such as that described in U.S. Patent Number 3,140,381. In this figure is shown a microcircuit element or component 14 having a plurality of leads 15 supported by a non-conductive plate 16 and positioned to be contacted by a pair of separated welding electrodes 18. This type of welding is commonly referred to as split electrode series welding or parallel gap welding since both electrodes contact the same side or surface of the workpiece or the lead 15. Thus, when the weld current is supplied from a power supply (not shown) to the weld head it flows first through one electrode then through the segment of the lead 15 between the contacting two electrodes and lastly through the other electrode and back to the power supply. This type of welding develops the weld between the electrodes horizontally at the point of contact of the lead 15 and the element to which it is to be joined and not between the electrodes vertically as is common when the electrodes are aligned and contact opposite sides of the workpiece.

While the improved electrode assembly of the present invention has been illustrated affixed to a specific weld head it should be understood that this is done for clarity and that its structure may be varied for attachment to other weld heads without departing from the scope of the invention.

In addition to FIG. 1, referring now to FIGS. 2, 3, and 5, the improved electrode assembly comprises a support or a clamp assembly including a pair of clamping members or support members 20 each having a semicircular slot 22 near one end and a pair of rectangular slots 24 in the other end. When both members are assembled, the semicircular slots form a bore which has a diameter sufficient to circumscribe the operating ram of the weld head as shown in FIG. 1. Since each of the clamping members 20 forms a conductor for the welding current, they are electrically insulated by a nonconducting bushing 26 such as a nylon bushing and are separated by an air gap 28. To secure the clamp assembly to the insulated surface of the ram 10, a retaining screw 30 is inserted through a bore in each member 20 and engages a retaining ring 32. To electrically insulate the retaining screws 30, each of the bores contains a non-conductive bushing 34 such as a nylon bushing.

Each of the electrodes 18 has a square shank and is clamped in a rectangular clamping slot 36 in different ones of a pair of electrode holders 38 by a screw 41. Typically, this operation is performed at the time of assembly of the structure so that precise lateral alignment of the two electrodes is established. Rotational alignment is established by the clamping of the square surfaces of the shank of the electrodes 18 in the clamping slots 36. This leaves only one adjustment for the operator or set-up person—the extension of the electrode 18 beyond the electrode holder 38.

It has been found that an inclination of the electrodes 18 of 20 degrees of arc from the vertical permits substantially vertical viewing of the subminiature workpiece by a microscope. Thus, as best seen in FIG. 3, the longitudinal axis of the clamping slot 36 is inclined from the vertical approximately 20 degrees of arc. This provides the desired inclination of the electrodes 18.

As discussed the improved electrode assembly of this invention has cantilever support of two independent electrodes which are mountable to a single operating ram. To accomplish this support each of the electrode holders 38 is attached to one end of a pair of short, wide cantilever leaf springs 40 of a material having high electrical conductivity such as spring steel which operate in tandem to permit the forward section of the electrode holder 38 to deflect vertically while maintaining lateral rigidity; while the other end is attached to one of the clamping members 20 at the end of the rectangular slot 24 therein. Typically, shown in FIGS. 2 and 3, the flat springs 40 are attached to the electrode holders 38 and the clamping members 20 by inserting a portion of their length in a groove 42 in each member and by soldering them therein by conventional soldering techniques. This method has been shown only for illustration since other conventional methods of attachment may be used without departing from the scope of the invention.

When force is applied to the electrodes 18, each portion of the electrode holder will deflect vertically providing good contact of both electrodes with irregular surfaces. However this deflection is limited by the stiffness of the pair of springs 40 and the width of the rectangular slot 24. In one preferred embodiment the spring 40 is of a material such as heat treated beryllium-copper and has a thickness of .007 inch allowing the electrode holder to deflect vertically .003 to .004 inch per pound of electrode force. In this embodiment the rectangular slot 24 has a width of .080 inch which limits the travel of the spring in one direction to .035 inch.

Referring now to FIGS. 2 and 4, the electrode holders 38 stand apart from each other, separated by an air gap 50. The gap 50 is established by adjusting a precision screw assembly 52. This assembly includes a shaft 54 having a threaded portion engaging a threaded bore in one member of the clamp assembly, an electrically nonconductive spacer 55 circumscribing a portion of the shaft 54, a spring 56 circumscribing the spacer 55 and seated to bear against the members 20 of the clamp assembly, and a pair of insulating sleeves 58 of a material such as nylon. One insulation sleeve 58 electrically insulates the clamping members through the path by the spring 56 and the other insulation sleeve 58 electrically insulates an adjustment knob 60 from one of the clamping members 20.

The adjustment knob 60 is affixed to an exposed end of the shaft 54 and typically, for precise adjustment, contains a plurality of division 62 each representing a thousandths of an inch of width of the air gap 50. Thus, the gap between the electrodes 18 remains fixed once the knob has been set, but if it is necessary to change the gap this may be done accurately and precisely by rotating the knob to the desired gap width setting.

In order for the electrode assembly to operate as part of series or parallel gap welding operation, each half of the assembly must be insulated from the other half because each provides a separate part of the circuit carrying the weld current. This insulation is achieved through the insulating bushings 26, 34 and 58 and the air gaps 28 and 50. However, to prevent direct shorting of the adjacent faces of the two square electrodes 18, which could result when an operator reduces the air gap 50 to substantially zero, a coating of about .0015 inch thickness of an insulating material such as modified silicon high temperature enamel is applied to these surfaces.

To make the electrode assembly compatible with other equipment in FIG. 1 are shown a pair of conductors 70 each connected to a different one of the electrode holders 30. It is the function of these conductors to sample the weld voltage across the section of the workpiece or the lead 15 contacted by the electrodes 18 and to furnish this information to an external circuit (not shown) such as the feedback control circuit of the Constant Voltage Power Supply, Model MCW-550 manufactured by the Hughes Aircraft Company, Oceanside, California.

While one embodiment of this invention has been herein illustrated, it should be appreciated by those skilled in the art that variations of the disclosed arrangement both as to its details and the operation of such details may be made without departing from the skill and scope thereof. Accordingly, it is intended that the foregoing disclosure and the showings made in the drawings may be considered as illustrative of this invention and not construed in a limited sense.

What is claimed is:

1. A welding electrode assembly comprising:
   a pair of electrode holders separated by an air gap each containing a welding electrode,
   a support assembly having two electrically insulated members;
   a plurality of flexible coupling members each affixed to one of said insulated members and to one of said electrode holders to provide cantilever supports for said electrodes; and
   gap adjustment means coacting with said support assembly to vary the width of the air gap between said electrode holders.

2. A welding electrode assembly comprising:
   a pair of electrode holders separated by an air gap each containing a welding electrode;
   a support assembly having two support members separated by an air gap;
   a plurality of flexible coupling members each affixed to one of said members and to one of said electrode holders to provide cantilever supports for said electrodes; and
   gap adjustment means coacting with said support assembly to vary the width of the air gap between said electrode holders.

3. A welding electrode assembly comprising:
   a pair of electrode holders separated by an air gap each containing a welding electrode;
   a support assembly having two support members separated by an air gap;
   a plurality of flexible flat springs each affixed to one of said support members and to one of said electrode holders to provide cantilever supports for said electrodes; and
   gap adjustment means coacting with said support assembly to vary the width of the air gap between said electrode holders.

4. A welding electrode assembly comprising:
   a pair of welding electrodes;
   a support assembly including two support members separated longitudinally by an air gap, said members each having a pair of transverse slots in one end;
   a plurality of flat spring members each secured in a different one of said transverse slot and having a free end projecting outward therefrom;
   a pair of electrode holders separated by an air gap each supported by the free end of a different one of said spring members and having an electrode holding slot and means coacting with said slot to secure said electrode therein; and
   a spring loaded shaft engaging said support assembly and including an exposed end having a calibrated knob affixed thereto for rotation of the shaft whereby the width of said air gap is varied by rotation of said knob.

5. A welding electrode assembly comprising:
   a pair of welding electrodes;
   a clamp assembly including two clamping members separated longitudinally by an air gap, said members each having a semicircular groove near a first end, and a pair of transverse slots in a second end;
   two pairs of flat spring members, each member secured in a different one of said transverse slot and having a free end projecting outward therefrom;
   a pair of electrode holders separated by an air gap each supported by the free end of a different pair of said spring members and having an electrode holding slot and means coacting with said slot to secure an electrode therein; and
   a spring loaded shaft engaging said clamp assembly and including an exposed end having a calibrated knob affixed thereto for rotation of the shaft whereby the width of said air gap is varied by rotation of said knob.

6. In combination with a weld head having a single movable ram an electrode assembly comprising:
   a pair of electrode holders separated by an air gap each containing a welding electrode;
   a support assembly affixed to the ram and having two support members separated by an air gap, each of said support members being electrically coupled to the weld head; and
   a plurality of pairs of flexible coupling members each pair affixed to different electrode holders and support members to provide cantilever supports for said electrodes.

7. In combination with a weld head having a single movable ram an electrode assembly comprising:
   a pair of electrode holders separated by an air gap each containing a welding electrode;
   a support assembly affixed to the ram and having support members electrically separated by an air gap each of said support members being electrically coupled to the weld head;
   a plurality of pairs of flexible coupling members each pair affixed to different electrode holders and support members to provide cantilever supports for said electrode; and
   gap adjustment means coacting with said support members to vary the width of the air gap between said electrode holders.

References Cited by the Examiner

UNITED STATES PATENTS

| | | | |
|---|---|---|---|
| 2,114,844 | 4/1938 | Krause | 219—78 |
| 2,421,021 | 5/1947 | Ellwood | 219—86 |
| 2,727,122 | 12/1955 | Gartner | 219—86 |
| 2,951,932 | 9/1960 | Heckman et al. | 219—78 |
| 3,207,884 | 9/1965 | Davis et al. | 219—86 X |

ANTHONY BARTIS, *Acting Primary Examiner.*

JOSEPH V. TRUHE, *Examiner.*